United States Patent
Goetsch (10) Patent No.: US 8,874,506 B2
(45) Date of Patent: Oct. 28, 2014

(54) PREVENTING DATABASE REPLICATION CONFLICTS IN A DISTRIBUTED ENVIRONMENT

(75) Inventor: Kelly Goetsch, Chicago, IL (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/609,122

(22) Filed: Sep. 10, 2012

(65) Prior Publication Data

US 2014/0074780 A1 Mar. 13, 2014

(51) Int. Cl.
*G06F 7/00* (2006.01)
*G06F 17/00* (2006.01)

(52) U.S. Cl.
USPC .......................................... 707/609; 707/613

(58) Field of Classification Search
USPC .................................................. 707/613, 609
See application file for complete search history.

(56) References Cited

U.S. PATENT DOCUMENTS

| | | | |
|---|---|---|---|
| 6,889,231 B1 | 5/2005 | Souder et al. | |
| 6,957,251 B2 * | 10/2005 | Wisner et al. | 709/220 |
| 8,171,111 B1 * | 5/2012 | Niedzielski et al. | 709/219 |
| 8,380,853 B2 * | 2/2013 | Kudo | 709/226 |
| 8,396,836 B1 * | 3/2013 | Ferguson et al. | 707/652 |
| 2006/0036761 A1 * | 2/2006 | Amra et al. | 709/238 |
| 2009/0157851 A1 * | 6/2009 | Dake et al. | 709/220 |
| 2009/0210513 A1 * | 8/2009 | Boss et al. | 709/219 |
| 2010/0205541 A1 * | 8/2010 | Rapaport et al. | 715/753 |

OTHER PUBLICATIONS

"Best Practices for Conflict Detection and Resolution in Active-Active Database Configurations Using Oracle GoldenGate" an Oracle White Paper, Nov. 2009 (24 pages).

* cited by examiner

*Primary Examiner* — Tony Mahmoudi
*Assistant Examiner* — Merilyn Nguyen
(74) *Attorney, Agent, or Firm* — Hickman Palermo Truong Becker Bingham Wong LLP; Karl T. Rees (57) ABSTRACT

A distributed system of data centers is configured to ensure that all data operations involving specific accounts are performed within a given time frame at only one data center. Once a data center has begun accessing data that is associated with an account, all requests to access or manipulate data for that account are redirected to that data center for a period of time. Thus, the data center becomes not only the "owner" of all data associated with the account for that period of time, but also the servicer of all requests associated with the account. The data center then asynchronously replicates changes to the data associated with the account to the other data centers. Since none of the other data centers are permitted to change the data associated with the account, conflicts in the replicated data are minimized.

24 Claims, 5 Drawing Sheets

PREVENTING DATABASE REPLICATION CONFLICTS IN A DISTRIBUTED ENVIRONMENT

TECHNICAL FIELD

Embodiments relate generally to distributed computing, and, more specifically, to techniques for preventing conflicts between data at distributed systems of data centers.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Data service providers often utilize distributed systems to provide data services, such as online shopping websites, social networking platforms, information services, and so forth. Commonly, these distributed systems comprise two or more geographically-separated data centers, each providing a same set of services through common application(s) and data. Distribution of the provision of data services amongst two or more geographically-separated data centers offers many advantages, including without limitation increased capacity, higher response times, and redundancy.

Each data center in such a distributed system is communicatively coupled to a common wide area network, such as the Internet. Different clients, such as personal and mobile computing devices operated by end users, are connected to different data centers. Clients are routed to different data centers as a result of any of a variety of addressing and load-balancing mechanisms. The data center to which a client connects may depend on factors such as geography, network topography, time of day, and/or and server capacity. As a result of common access mechanisms for the services provided by each of the data centers, such as the use of common uniform resource locators to reference common applications at each of the data centers, the existence of multiple data centers is typically transparent to most end users. Since each data center offers a same set of services, end users are thus generally unaware of which data center they are connected to, or even the fact that there are multiple data centers that provide the services.

There is typically a high latency between some or all of the data centers operated by a data service provider. On account of the high latency and/or other factors, it is often not practical to keep the data at each data center perfectly synchronized. For example, conventional locking mechanisms would require the exchange of several messages between some or all of the data centers before any database operation could be performed. Each message could spend on the order of hundreds or thousands of milliseconds in transit between data centers. Meanwhile, in some embodiments, a single web page generated by a data center could require hundreds of database operations. Thus, keeping the data at each of the data centers synchronized through conventional locking mechanisms can greatly slow the provision of the web page.

Instead, data at data centers is often kept loosely synchronized through the use of bi-directional replication tools. Each data center performs operations on its own copy of the data without regards to the status of the data at other data centers. At some time subsequent to a particular data center performing an operation on its own copy of the data, the operation is "replicated" at each of the other data centers, thus ensuring that the data at each of the data centers is consistent with that of the particular data center.

It is of course possible that, between the time that a first data center performs a first operation and the time that the first operation is replicated at a second data center, the second data center will have performed a second operation on the data that conflicts with the first operation. While such conflicts can be "resolved" through the use of conflict detection and resolution mechanisms, the use of conflict resolution mechanisms can result in issues such as corrupted orders or lost data, and is therefore undesirable. However, until recently, in most embodiments, either the occurrences of such conflicts had typically been rare enough that the use of conflict resolution mechanisms presented a "good enough" solution, or an active/passive system is implemented in which replication is performed unidirectionally from a single active data center to one or more passive data centers.

Recently, occurrences of conflicts in replicated data are increasing, particularly as a result of an increasing amount of shared data and collaboration by users or entities operating at geographically diverse locations or at a same geographic location, but on different networks. An example of this problem involves multiple users of an online shopping site presenting the same account credentials within the same time frame but at different locations. For example, family members may share an account for a variety of purposes. Because the family members are at different locations, the family members may be directed to different data centers. If one family member changes a shopping cart or profile data while interacting with a first data center, and another family makes changes to the same shopping cart or profile data adds while interacting with a second data center, the account data may become corrupted. This and similar problems can occur even if the same user access the account data with two different devices that are in close proximity to each other, but connected to different networks. For example, a user's smart phone may be directed to a first data center because it is connected to a cell phone network, while the user's tablet is directed to a second data center because it is connected to a WiFi network These and other problems complicate the operation of distributed systems of data centers.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, wellknown structures and devices are shown in block diagram form in order to avoid unnecessarily obscuring the present invention.

Embodiments are described herein according to the following outline:

1.0. General Overview
2.0. Structural Overview
 2.1. Databases and Database Servers
 2.2. Application Servers
 2.3. Clients
 2.4. Load balancing
 2.5. Miscellaneous
 2.6. Example System of Data Centers
3.0. Functional Overview
4.0. Implementation Examples
5.0. Implementation Mechanism—Hardware Overview
6.0. Extensions and Alternatives 1.0. General Overview Approaches, techniques, and mechanisms are disclosed for reducing conflicts between data at data centers. In an embodiment, a distributed system of data centers is configured to ensure that all data operations involving specific accounts (e.g. user accounts, group accounts, etc.) are performed within a given time frame at only one data center. Once a data center has begun accessing data that is associated with an account, all requests to access or manipulate data for that account are redirected to that data center for a certain period of time. Thus, the data center becomes not only the "owner" of all data associated with the account for that period of time, but also the servicer of all requests associated with the account. The data center then asynchronously replicates changes to the data associated with the account to the other data centers. Since none of the other data centers is permitted to change the data associated with the account, conflicts in the replicated data are minimized. Since the requests are serviced from a single data center, without that data center having to interact with the other data centers, response times remain relatively low in spite of the redirection.

The period of time during which requests associated with an account will be redirected to a data center varies from embodiment to embodiment. In an embodiment, the period of time is tied to session inactivity timeouts, thus ensuring that once a client begins communicating with a data center, it will continue to communicate with that data center until the end of its session. However, in other embodiments, requests may be redirected for longer or shorter time periods.

In an embodiment, each time a client signs-in to a data center, whether explicitly through providing log-in credentials, or implicitly via a cookie, the data center determines whether the account into which the client signed-in is involved in any active sessions at any other data center. If so, the client is redirected to the other data center for a period of time, such as the duration of the client's session with the data center.

In an embodiment, a system for practicing the described techniques comprises geographically-separated data centers. Each data center of the data centers comprises one or more computing devices at which one or more application servers, one or more database servers, and one or more databases are implemented. The system further comprises one or more network interfaces by which the one or more computing devices of the data center are coupled to computing devices at other data centers by one or more wide area networks. Each of the geographically-separate data centers is configured to: store data associated with accounts; asynchronously replicate changes to the data to other data centers; service first requests only after determining that no other data centers have active sessions involving particular accounts associated with the first requests; and redirect second requests to other data centers responsive to determining that the other data centers have active sessions involving particular accounts associated with the second requests at the times of the second requests.

In other aspects, the invention encompasses a computer apparatus and a computer-readable medium configured to carry out the foregoing steps.

2.0. Structural Overview

Figure 1:
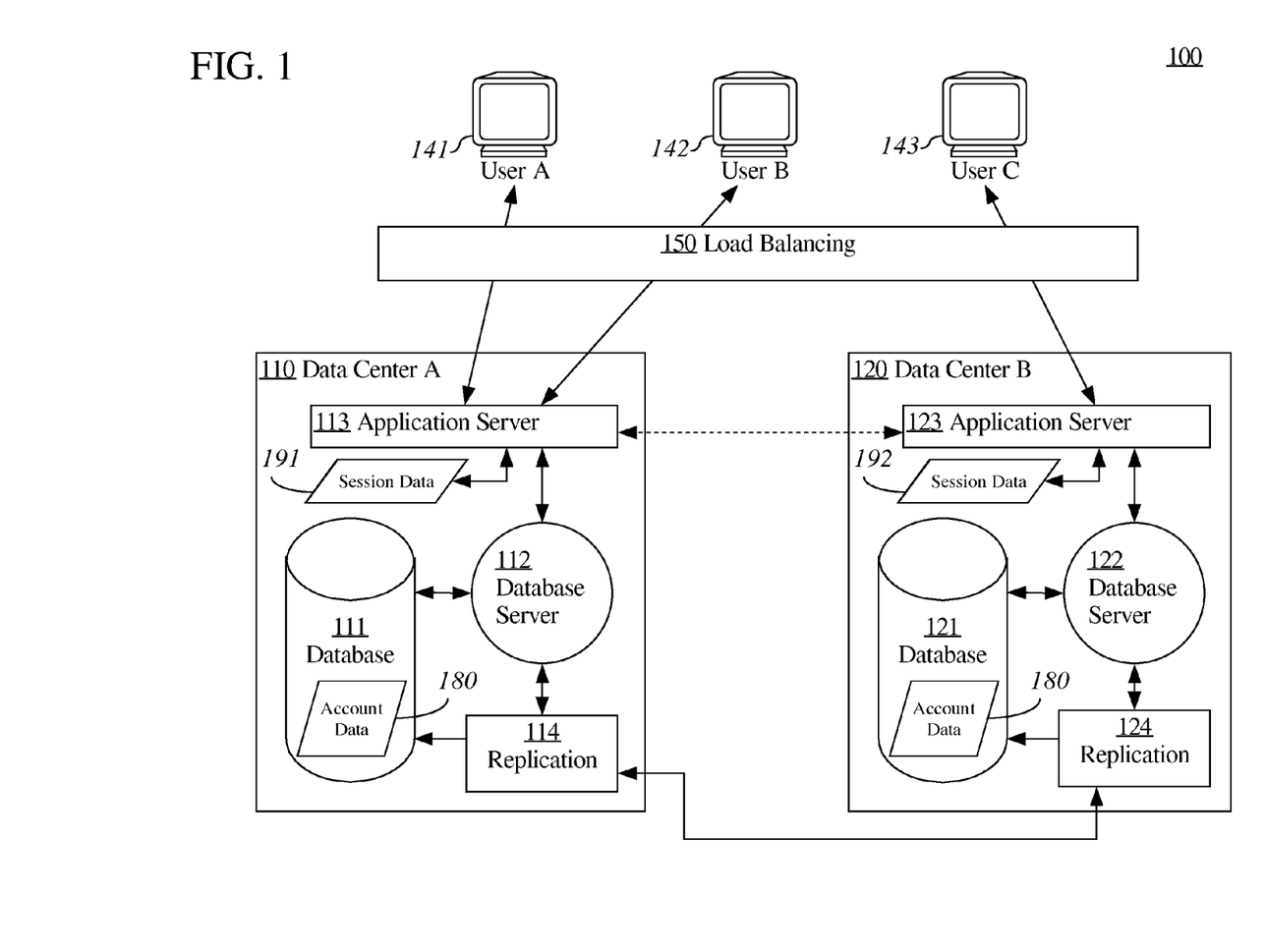
FIG. 1 is a block diagram of a system 100 in which embodiments may be practiced.

FIG. 1 is a block diagram of a system 100 in which embodiments of the invention may be practiced. System 100 comprises data centers 110 and 120. Each of data centers 110 and 120 comprises one or more computing devices coupled together by a private network, such as a local area network. Data centers 110 and 120 are further coupled to one or more wide area networks via, for example, one or more external communication links at one or more gateway devices (not depicted). Data centers 110 and 120 communicate with each other over these one or more wide area networks, as well as with clients such as clients 141-143.

2.1. Databases and Database Servers

One or more storage devices at, or coupled to, the one or more computing devices of data centers 110 and 120 store databases 111 and 121, respectively. Databases 111/121 may store a variety of data used by the various components of data centers 110/120, including account data 180.

Account data 180 may include any information that is associated with an account, such as account authentication data, personal data, financial data, messages, account settings, preferences, transaction details, logs, records, tracking information, balances, credits, scores, and so forth. Accounts may belong to a user, a group of users, a company, or any other entity, depending on the embodiment. In some embodiments, the terms "data associated with an account" and "account data" refer to data that is uniquely associated a single account. Thus, data that is associated with many accounts is not "data associated with an account" for the purposes of such embodiments. However, the techniques described herein would be nonetheless applicable to data that belongs to an identifiable group of accounts, to the extent that the group may itself be considered a single account. For example, when a user signs in to an account that belongs to the group, the user may be considered to have signed in to a group account, and may thus be redirected to a different data center based on the group account.

Databases 111/121 may store data in a variety of underlying structures, including logical databases and tables. Data centers 110/120 may further include one or more redundant copies of databases 111/121. While databases 111/121 are independent from each other, databases 111/121 store copies of at least some of the same data by means of replication components 114 and 124.

The one or more computing devices of data centers 110 and 120 execute database servers 112 and 122, which are communicatively coupled to databases 111 and 121 respectively. For example, database server 112 may communicate read or write requests to database 111 over an Infiniband link. In some embodiments, each of database servers 112/122 comprises a cluster of server processes executing at different computing devices. Database servers 112/122 process database commands from other components, such as application servers 113 and 123, to read data from databases 111/121, write data to databases 111/121, and perform logical database operations on data read from databases 111/121. In an embodiment, the database commands processed by database servers 112/122 are in a format such as structured query language ("SQL").

In an embodiment, database servers 112/122 operate independently from each other. However, after a database server 112/122 performs database operations that affect certain sets of data, a replication component 114/124 shares information about the database operations with the other database server 112/122 so that the database operations may be replicated asynchronously at the other database server 112/122. Replication of database operations via replication components 114/124 is bi-directional, in that database operations at database 121 may be replicated at database 111, and vice versa. Replication components 114/124 may be integrated into database servers 112/122, or replication components 114/124 may be implemented by separate processes at the one or more computing devices of data centers 110/120.

For example, in an embodiment, database server 112 performs database operations as part of transactions, and keeps a log of any transactions performed. Replication component 114 may review the transaction log at periodic intervals, or in response to detecting new transactions. The replication component 114 may share the transaction data with replication component 124. Replication component 124 may then instruct database server 122 to replicate the transactions described by the transaction data, thereby updating database 121 to reflect the changes made at database 111. In an embodiment, only certain tables or other structures in database 111 may be marked for replication, and thus only certain logged transactions are actually replicated.

Any suitable replication component may be used. Some examples of such suitable replication components are described in U.S. Pat. No. 6,889,231, titled "Asynchronous Information Sharing System" and filed on Dec. 2, 2002, the entire contents of which are hereby incorporated by reference for all purposes as if set forth herein.

2.2. Application Servers

The one or more computing devices of data centers 110 and 120 further execute application servers 113 and 123, respectively. Among other aspects, application servers 113/123 provide applications and/or services to clients such as clients 141-143 over a wide area network. For example, application servers 113/123 may receive HTTP requests from clients 141-143 and provide, in response, web pages or XML documents. Application servers 113/123 provide at least some of the same applications and/or services to clients 141-143, such that clients 141-143 may obtain these same applications and/or services regardless of with which application server 113/123 the clients 141-143 are communicating. In fact, the same client 141-143 may obtain these same applications and/or services at different times from different ones of application servers 113/123.

The ability to provide these same applications and/or services via each of application servers 113/123 is facilitated in part by the replication of data operations at databases 111/121, as discussed above. In some embodiments, the ability to provide these same applications and/or services is further facilitated by communications between application servers 113/123 over a wide area network. In an embodiment, these same applications and/or services are provided in such a manner that it is transparent to users at clients 141-143 whether they are communicating with application server 113 or application server 123. Such transparency is further facilitated by the use of load balancing component(s) 150, as discussed in a subsequent section.

In an embodiment, application servers 113/123 support one or more web application frameworks for executing applications written in languages such as Java, PHP, or .NET. In some embodiments, application servers 113/123 may feature an integrated web server, or may communicate with one or more web servers that execute separately over the one or more computing devices of data centers 110/120. Application servers 113/123 may also or instead be standalone processes compiled in languages such as C++. Application servers 113/123 may comprise one or more clustered server processes that execute in concert on one or more of the one or more computing devices of data centers 110/120, respectively. In an embodiment, application servers 113/123 are implemented as middleware in a mid-tier, whereas database servers 112/122 are implemented as backend components.

Applications servers 113/123 provide applications and/or services based on data stored inside of databases 111/121. To this end, application servers 113/123 communicate with database servers 112/122 via database commands. For example, application server 113 may send a SQL query over a local area network to database server 112. In response to certain database commands, application servers 113/123 may receive structured data, such as SQL result sets. Application servers 113/123 then use the structured data to determine how to respond to certain requests from clients 141-143. For example, the application servers 113/123 may generate a web page based on some or all of the structured data.

In an embodiment, application servers 113/123 are built on, or have been extended to include, a common platform featuring extensible components for implementing various features described herein. Developers may create applications that utilize these extensible components via application programming interfaces (APIs), without the developers having to write code to implement the extensible components themselves. For example, application servers 113/123 may include extensible components for creating and managing sessions with clients 141-143. To this end, application servers 113/123 may store session data 191 describing such sessions. Session data 191 may be stored in any suitable memory or storage device, including in database 111/121. Application servers 113/123 may further include extensible components for authenticating and "signing-in" users based on account data 180. Each session described in session data 191 may, for instance, be mapped to a particular account described in account data 180. Application servers 113/123 may further include extensible components for interacting with database servers 112/122. For example, such extensible components may generate SQL statements to send to database servers 112/122.

Application servers 113/123 may further include extensible components for coordinating with application servers at other data centers. For example, application server 113 may include extensible components for communicating with application server 123 to ensure that only one of application servers 113/123 are conducting a session involving a particular account at any given time. Such extensible components may automatically redirect a client 141-143 to a data center 110/120 that has an active session with a particular account, when the client 141-143 attempts to sign in to the particular account at the other data center 110/120.

Application servers 113 and 123 may further include any number of additional extensible components, including components to support e-commerce activities such as shopping carts, order processing, and inventory management. Alternatively, any of the above described components may be implemented directly within applications executed by application servers 113/123.

Any suitable application server may be utilized for application servers 113/123, including for instance Oracle's WebLogic. In an embodiment, various extensible components for implementing the techniques described herein are provided by a platform such as Oracle ATG Web Commerce.

2.3. Clients

Clients 141-143 are computing devices such as personal computers or smartphones that are connected to data centers 110/120 by a wide area network such as the Internet. Users may operate clients 141-143 to interact with application servers 113/123. For example, clients 141-143 may execute web browsers that communicate with application servers 113/123 via a hyper-text transfer protocol (HTTP) to retrieve web pages that are based on the data in databases 111/121. Clients 141-143 may interact with application servers 113/123 over the wide area network in any of a number of other ways, including via desktop applications or mobile applications other than a web browser.

In an embodiment, state information about the interactions between clients 141-143 is tracked in part by an exchange of session data and/or cookies that are clients 141-143 and application servers 113/123. Clients 141-143 provide session identifiers and/or information from the cookies to application servers 113/123 when they send certain requests to application servers 113/123. Application servers 113/123 then use the session identifiers and/or information from the cookies to locate appropriate state information in session data 191/192 and/or account data 180. Once a client has presented credentials and been authenticated, the state information may include an account identifier that identifies the account, described in account data 180, in to which the client 141-143 has "logged-in." The state information may include other data, such as shopping cart information, transaction data, and so forth. In other embodiments, some or all of the necessary state information is provided in each request to application servers 113/123 rather than in session data 191/192 or account data 180.

2.4. Load Balancing

In an embodiment, interactions between clients 141-143 and data centers 110/120 are routed via one or more load balancing component(s) 150. Because data centers 110/120 share both similar application servers 113/123 and similar data in databases 111/121, clients 141-143 may access the same sets of services from data centers 110/120 regardless of which data center 110/120 actually interacts with clients 141-143. The load balancing component(s) 150 take advantage of this fact to balance the "load" of interacting with clients 141-143 among data centers 110/120. Specifically, load balancing component(s) divide incoming requests from clients 141-143 among data centers 110/120 by directing the requests to different data centers depending on characteristics of the request or the requesting client 141-143. For example, as depicted in FIG. 1, load balancing component(s) 150 may direct clients 141-142 to data center 110, but direct client 143 to data center 120.

In an embodiment, load balancing component(s) 150 are primarily proximity-based, in that requests will typically be routed to the data center 110/120 that is geographically or topologically "assigned" to the location from which the requests originated. For example, a company may deploy data center 110 to service requests originating from clients the Eastern portion of North America, and data center 120 to service requests originating from clients in the Western portion of North America. As another example, load balancing component(s) 150 may simply direct requests to the data center 110/120 that is geographically or topologically closest to the requestor. In an embodiment, load balancing component(s) 150 may also or instead utilize other factors to determine where to direct requests, such as current server load, server capacity, server availability, time of day, current bandwidth, latency between the requesting client and the various data centers, and so forth.

In an embodiment, a given client 141-143 will only interact with one of application servers 113 or 123 during a given period of time (a "session"). That is, if a particular client 141-143 needs to interact with (e.g. access an application at) one of application servers 113/123, and the particular client 141-143 has already interacted with a particular application server 113/123 within a certain period of time (e.g. conducted a session within the last three hours), the load balancing component(s) 150 are configured to cause the particular client 141-143 to continue to interact with the same particular application server 113/123. By contrast, when a particular client 141-143 has not interacted with one of application servers 113/123 during a given period of time (e.g. not conducted a session within the last three hours), the load balancing component(s) 150 are configured to direct the particular client 141-143 to any application server 113/123 selected by the load balancing component(s) 150, indiscriminately of the application server 113/123 with which the particular client 141-143 last communicated.

In an embodiment, in spite of a load balancing component 150 directing a request from a first client 141-143 to a first data center 110/120, the first data center 110/120 may redirect (or cause the load balancing component 150 to redirect) the request to another data center 110/120. For example, the first data center may insert routing instructions into an HTTP response header and/or cookie that instruct the first client 141-143 to send the request to a different data center 110/120 for a specified period of time (e.g. a maximum session duration). In an embodiment, a data center 110/120 may further or instead instruct a load balancing component 150 to continue to redirect requests from the first client 141-143 for a specified period of time. In an alternative embodiment, a data center 110/120 may continue to serve as a proxy for requests from the first client 141-143, and relay traffic to and from the appropriate data center.

In an embodiment, redirection is used to ensure that no two data centers are conducting active sessions with the same account at the same time. Redirection may occur, for example, when the first data center 110/120 determines that the request is associated with an account, in account data 180, that is also associated with a current or recent session between the other data center 110/120 and another client 141-143. For example, upon client 142 logging into an account at application server 123, application server 123 may instruct load balancer 150 to redirect requests from client 142 to application server 113 because application server 113 has indicated that it is already conducting a session with client 141, and client 141 is currently logged into the same account.

In some embodiments, load balancing component(s) 150 include domain name server (DNS) based components. Data centers 110/120 are collectively assigned to a common domain name. When accessing a service provided by data centers 110/120, clients 141-143 are configured to send DNS requests to resolve the common domain name to a specific Internet Protocol (IP) address. Each data center 110/120 is assigned a different IP address. Load balancing component(s) 150 respond to the DNS requests by resolving the common domain name to different IP addresses for different data centers, based on the afore-mentioned factors.

In the depicted embodiment, load balancing component(s) 150 are logically deployed outside of data centers 110/120. For example, load balancing component(s) 150 may be an edge-based load balancer (e.g. load balancers with layer 7 edge-based reverse proxy). The edge-based load balancer may be an authoritative name server hosted, for example, by a third party provider of managed DNS or content-delivery network (CDN) services. Alternatively, the authoritative name server may be hosted by the same entity as the data centers 110/120. In an embodiment, each client 141-143's DNS resolution requests is randomly resolved to one of the IP addresses assigned to data centers 110/120, for instance, via a round-robin approach.

In other embodiments, each of data centers 110/120 may comprise its own load-balancing component(s) 150, in addition to or instead of the load balancing component(s) outside of data centers 110/120. When a data center's internal load balancing component 150 receives an HTTP request from a client 141-143, the load balancing component 150 utilizes the above factors to redirect the client 141-143 to a more suitable data center if necessary. For example, the load-balancing component(s) 150 may include physical appliance-based load-balancers located at each of data centers 110/120. The load-balancing component(s) 150 may or may not communicate with each other using solutions such as Global Traffic Management to redirect requests.

In yet other embodiments, other load-balancing solutions may be utilized. Any load-balancing solution capable of distributing and redirecting requests as described herein may be utilized to practice the described techniques. For example, any combination of layer 3 and layer 7 components may be utilized.

2.5. Miscellaneous

System 100 may comprise any number of additional, similarly-configured data centers that service different sets of clients. Database operations at each database of each data center may be replicated asynchronously at each other database of each other data center. Load balancing component(s) 150 may ensure that requests from these different sets of clients are distributed to these additional data centers. Clients may be redirected to these additional data centers as described herein.

Data centers 110/120 may include additional application servers, database, and other components. Other systems may also include many more clients that interact with data centers 110/120. In an embodiment, data centers 110/120 are further coupled to redundant data centers that take the place of data centers 110/120 in the event of failure.

As a practical matter, the use of a computer system in claimed embodiments is required. For example, each of data centers 110/120 may be implemented by one or more computer systems executing collectively as a server. The components thereof may, for example, be implemented by one or more hardware processors of those one or more computer systems, configured to execute instructions for performing the various functions described herein. The techniques described herein should not be construed in any way as being amendable to being performed mentally or manually.

2.6. Example System of Data Centers

Figure 2A:
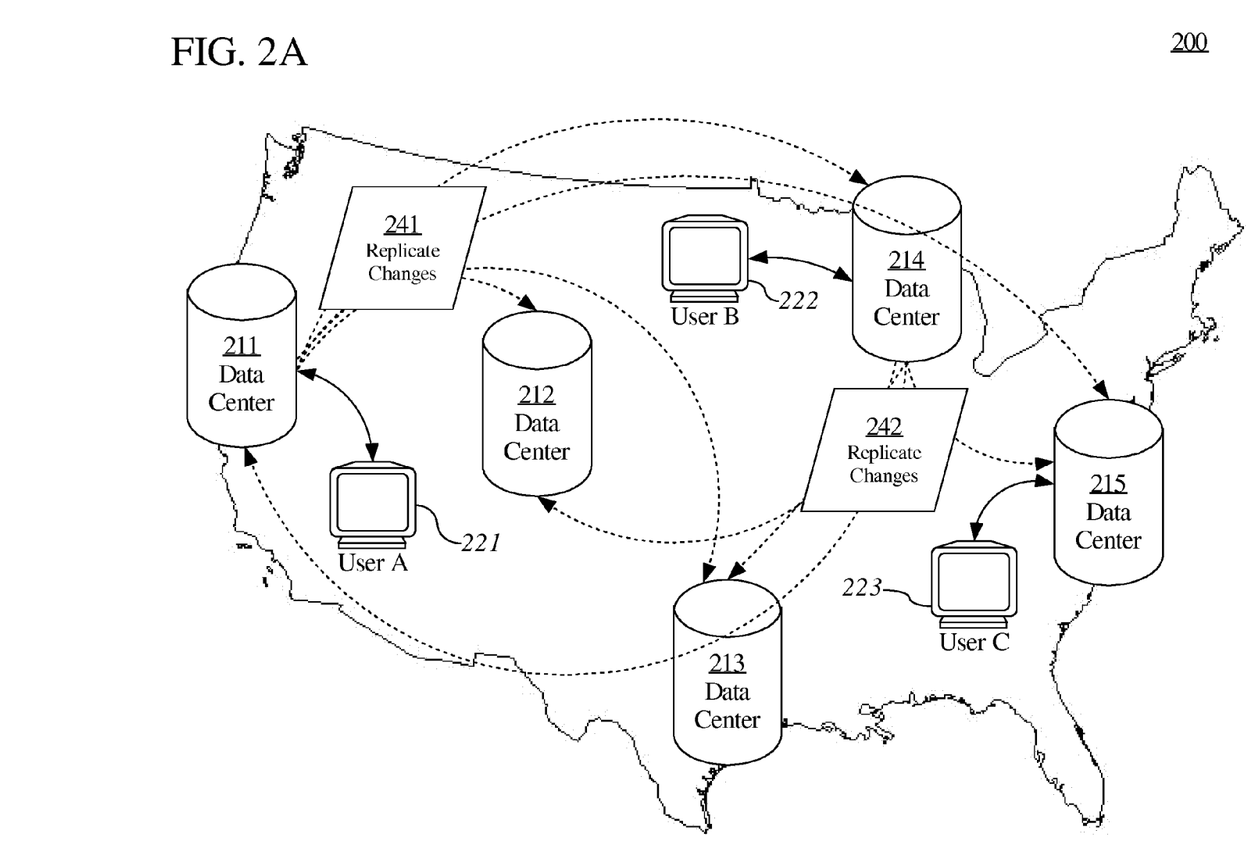
FIG. 2A and FIG. 2B illustrate the operation of an example system of data centers.
Figure 2B:
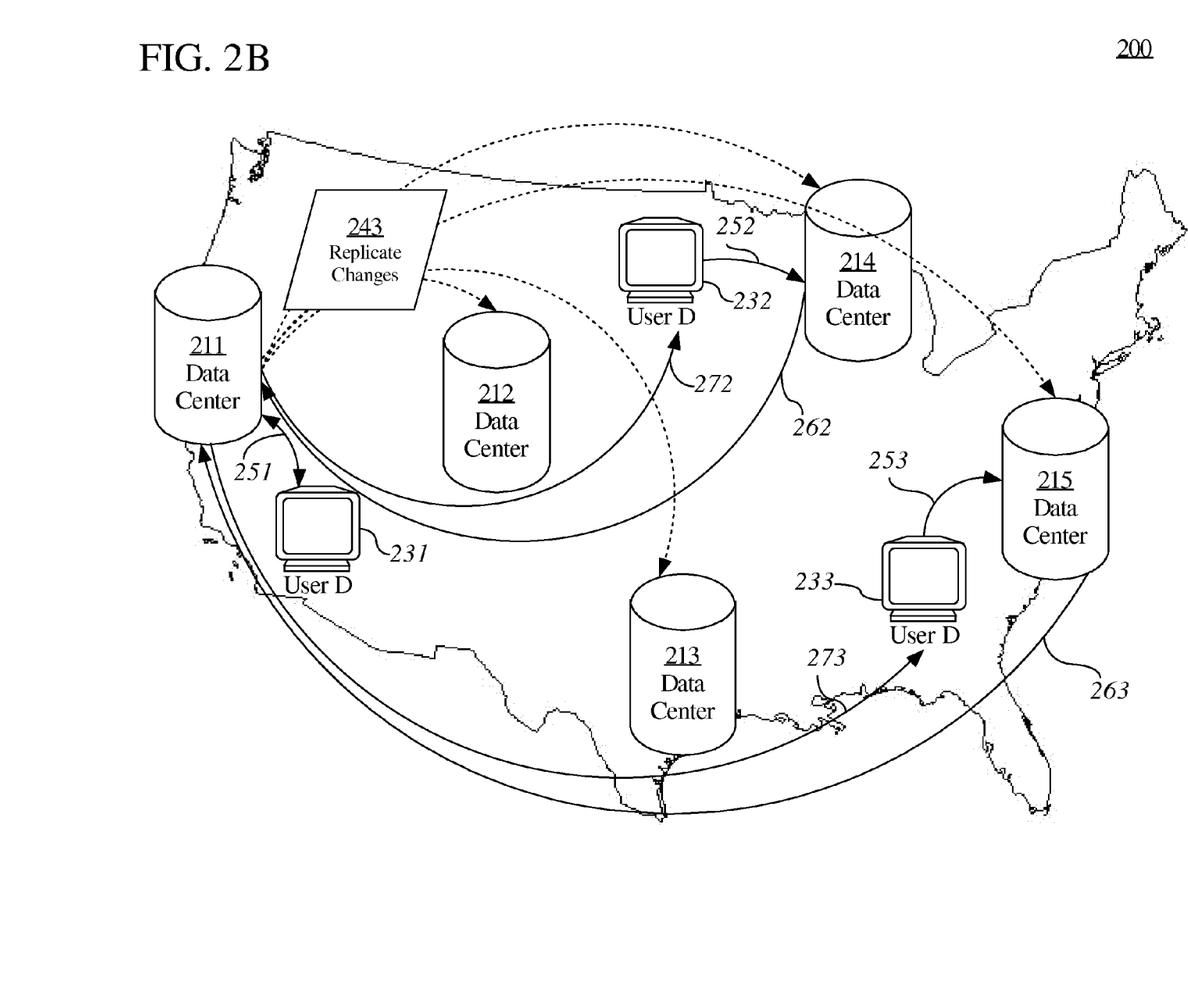

FIG. 2A and FIG. 2B illustrate the operation of an example system 200 of data centers, according to an embodiment. System 200 is but one example of a system in which the described techniques may be practiced. Other systems may include additional or fewer components, in potentially varying arrangements.

System 200 comprises data centers 211-215, each of which may include components such as described with respect to data centers 110/120 of FIG. 1. Data centers 211-215 are distributed across the United States. Thus, different clients 221-223 (as depicted in FIG. 2A) and 231-233 (as depicted in FIG. 2B) interact with different data centers 211-215. For example, in FIG. 2A, client 221 may have been directed to data center 211 on the West Coast of the United States via a load-balancing mechanism or other suitable proximity-based routing mechanism (e.g. Anycast). Similarly, client 222 is directed to a data center 214 in the Midwest of the United States, and client 223 is directed to a data center 215 on the East Coast of the United States.

Interactions between client 221 and data center 211 result in changes at data center 211. For example, the interactions may result in modifying or inserting data into a replicated table inside of a database such as database 111/121. At some point subsequent to these changes being made, the changes are asynchronously replicated at each of data centers 212-215 through replicate changes operations 241. Similarly, interactions between client 222 and data center 214 result in changes at data center 214 that are replicated at each of data centers 211-213 and 215 through replicate changes operations 242. Replicate changes operations 241 and 242 may be performed by, for example, replication components such as replication components 114/124 of FIG. 1. Not all interactions between clients 221-223 and data centers 211-215 result in changes that need to be replicated, however. For example, the interactions between client 223 and data center 215 do not result in any changes that need to be replicated.

The interactions between clients 221-223 and data centers 211, 214 and 215 are associated with different accounts for "User A," "User B," and "User C," respectively. The depicted embodiment assumes that no other interactions associated with these different user accounts are occurring at any data center other than the respectively depicted data centers of FIG. 2A.

By contrast, in FIG. 2B, the interactions requested by each of clients 231-233 are associated with the same user account, "User D." For example, a set of geographically separated friends or family having access to a same account may be attempting to access services associated with that account within a same time frame. Client 231 is the first client to attempt to access the service, and is routed through conventional techniques to the nearest data center, data center 211. Data center 211 services request 251 from client 231, resulting in changes to data that will eventually need to be replicated at each of data centers 212-215 through replicate changes operations 243.

Subsequently, client 232 attempts to access the service and is routed through conventional techniques to the nearest data center, data center 214. Since replication is asynchronous, data center 214 may not yet have received any replicated changes from data center 211. If data center 214 were to handle request 252 from client 232, data center 214 would risk making changes to the user account data for "User D" that would conflict with those made at data center 211. Rather than employ a conflict detection/resolution scheme for the user account data, data center 214 receives an indication that data center 211 is, or has recently conducted a session that involved the account for "User D." Data center 214 therefore causes a redirected request 262 to be sent to data center 211, either by redirecting request 252 directly, or by instructing client 232 or a load balancing component to redirect communications to data center 211. Data center 211 then sends a response 272 to client 232. Client 232 then proceeds to interact with data center 211, and any changes that result from the interaction may be replicated via replicate changes operations 243.

Similarly, client 233 is initially routed to data center 215. Request 253 from client 233 is then redirected as request 263 to data center 211. Data center 211 then sends response 273 to client 233.

Redirected requests 262 and 263 only occur because requests 251-253 all occur within a certain time frame relative to each other. If data center 214 (or data center 211) were to receive another request from 232 after the time frame has lapsed, the request would be handled by the data center to which the client 232 would normally be routed, which in this case would be data center 214. In an embodiment, the end of the time frame is determined by adding a predefined amount of time to the last interaction between a client 231-233 and data center 211 that involved the account for "User D." The amount of time after which clients 232 and 233 are returned to their normal data center may be vary from embodiment to embodiment. In any case, the amount of time should be of adequate duration to ensure that all changes resulting from the last interaction involving "User D" at data center 211 will have been replicated to data centers 212-215. In at least some embodiments the amount of time is of adequate duration to ensure that all existing sessions involving the particular account will have been reset due to a session or inactivity timeout. For example, the amount of time may range from a few minutes to a few hours depending on the architecture of system 200.

In an embodiment, clients 231-233 may engage, within the same time frame, in other interactions with data centers 211-215 that do not involve the account for "User D." For example, clients 232-233 may sign out of the account for "User D." Depending on the embodiment, redirection may or may not continue. In an embodiment, redirection never occurs unless clients 231-233 are engaged in interactions that involve account data. For example, redirection would not occur if clients 231-233 were interacting with data centers 211-215 anonymously. In an alternative embodiment, redirection also does not occur if clients 231-233 are interacting with data centers 211-215 in such a manner that did not rely on account data for anything other than authentication.

3.0. Functional Overview

Figure 3:
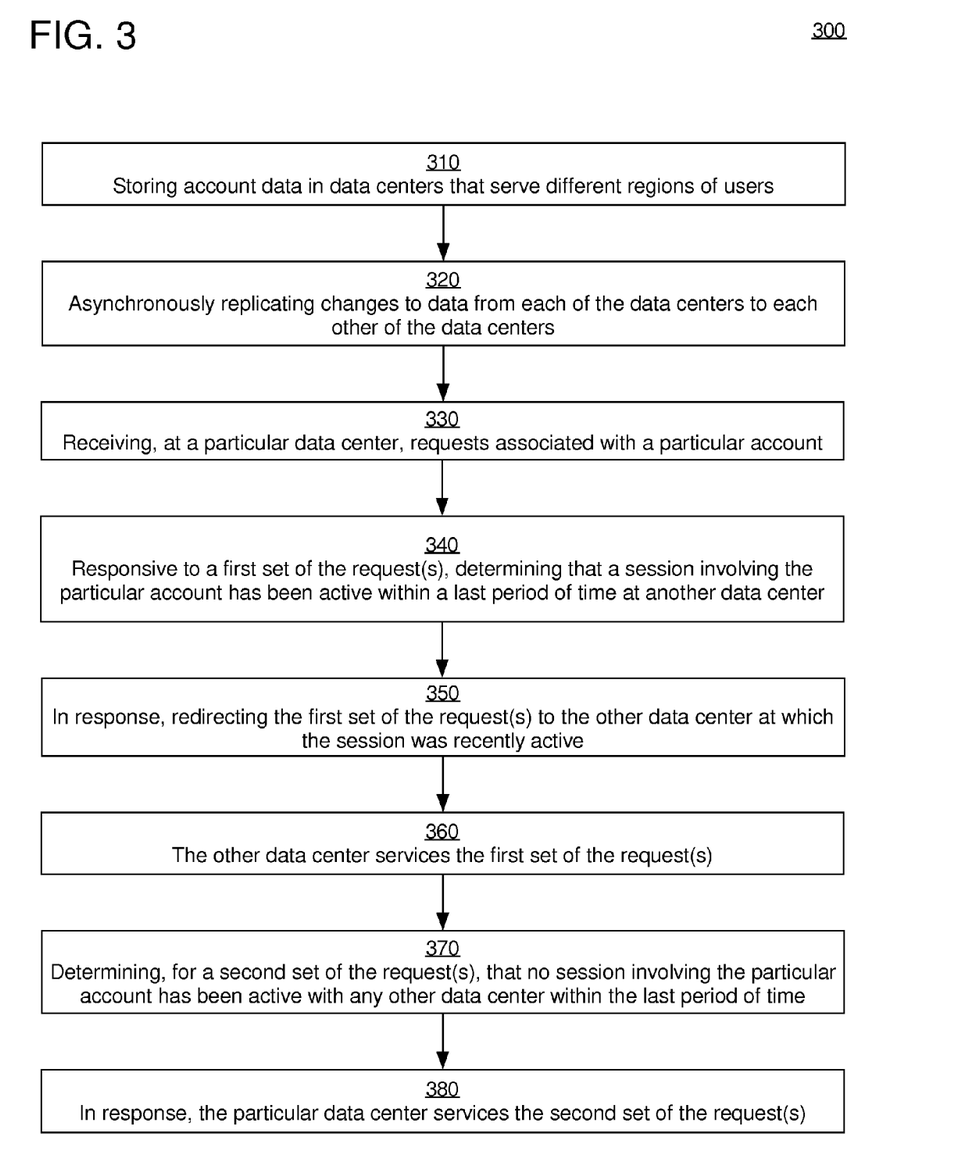
FIG. 3 depicts a flow diagram 300 of an example method for reducing conflicts in account data replicated amongst geographically-separated data centers.

FIG. 3 depicts a flow diagram 300 of an example method for reducing conflicts in account data replicated amongst geographically-separated data centers, according to an embodiment.

Block 310 comprises storing account data in data centers that serve different regions of users, such as data centers 110 and 120, or 211-215. In order to serve these regions, the data centers are geographically-separated. The amount of geographic separation between the data centers will vary from embodiment to embodiment, but in any event be of such a nature that each of the data centers is coupled to each other of the data centers by high-latency connections. For example, in an embodiment, at least one of the data centers is more than five-hundred miles from another of the data centers. The account data stored at the data centers include at least first data items that are each associated with one or more particular accounts of a plurality of accounts, such as account data 180.

Block 320 comprises asynchronously replicating changes to data from each of the data centers to each other of the data centers. For example, each data center may include a replication component such as replication components 114/124. In an embodiment, each data center uses Oracle GoldenGate technology for bi-directional replication, with backup supported by Oracle Data Guard. However, any other suitable replication component may be used.

Block 330 comprises receiving, at a particular data center of the geographically-separated data centers, requests associated with a particular account of the plurality of accounts. The requests may originate from clients such as clients 141-143, and may or may not have been routed to the particular data center via load-balancing component(s) such as load balancing component 150. The requests include account identifying data that either explicitly identifies the particular account, such as an account identifier, or that is permanently or temporarily mapped to the particular account, such as a device address or session identifier. The particular data center determines that the requests are associated with the particular account based on this account identifying data.

In an embodiment, the requests of blocks 330 (and 340-380) may include only initial requests that identify the particular account, such as implicit or explicit "login" requests that comprise authentication data such as an account name, account password, session token, and/or cookie-based identifier. After signing-in to a particular account in response to such an initial request, the data centers may receive subsequent requests associated with the initial request within a certain time period as part of a "session." The data centers may treat these subsequent requests normally, without determining whether the subsequent requests require redirection. In other embodiments, all requests, regardless of when they are received relative to the life of a session, are considered for redirection, per flow 300.

The requests may include, for example, requests for web pages or other content(s) that embed or are otherwise based on data associated with the particular account. The requests may also or instead include, for example, requests for services related to and/or for performance of data operations on data associated with the particular account.

Block 340 comprises, responsive to a first set of one or more of the requests, determining that a session (or other interaction) involving the particular account has been active within a last period of time at another data center. For example, each data center may log when it begins a session with an account, engages in a transaction with the account, and/or otherwise interacts with the account. Such logs may be regularly replicated to each data center. Block 340 may thus comprise, in response to the particular data center receiving a login request for the particular account, accessing the logs associated with account data for the user to determine when the user last interacted with a data center within a certain period of time. Alternatively, such information may be gathered from session data replicated at each data center by, for instance, a product such as Oracle Coherence Web.

As another alternative, block 340 may comprise sending queries to each of the other data centers. The queries specify the particular account. In response to the queries, the other data centers may examine session logs, such as session data 191, for the last period of time. If any of the logged sessions is associated with the same particular account, the data center that logged the session sends a response to the particular data center indicating that it has conducted a session within the last period of time. For instance, if the period of time is a period of an hour, each data center may respond to the query from the particular data center by determining whether any clients have engaged in interactions involving the particular account within the last hour.

Block 350 comprises, responsive to the determination of block 340, the particular data center redirecting the first set of one or more of the requests to the other data center at which the session involving the particular account was recently active. Any suitable redirection technique may be utilized, including without limitation those discussed elsewhere in this application. In contrast to the particular data center, the other data center is typically not a data center to which any of the first set of request(s) would have been assigned by geographical or topological proximity.

Block 360 comprises the other data center servicing the first set of one or more of the requests. For example, block 360 may comprise an application server at the other data center generating and sending web pages to the requestor based on the requests and data associated with the particular account. Block 360 may also or instead comprise a database server at the other data center writing changes to the data associated with the particular account. These changes may subsequently be replicated to all of the data centers, including the particular data center, in accordance with block 320.

Blocks 340-360, in other words, redirect clients to a common data center for services when multiple clients use the particular account in multiple locations. For example, an account at an online retailer may be utilized by multiple individuals within the same family in different states within a same period of time (e.g. parents and children, or traveling spouses). The first person to utilize the account within the time frame may have connected to the other data center. Thus, in accordance with the techniques described herein, the second person to utilize the account will not be allowed to access the account at the other data center, but will instead be redirected to the other data center. As another example, a coupon provider may tie certain discounts to a social networking account. The user of the social networking account may share the discount with many of his or her friends, some of which are located in different regions of the country. When the friends attempt to access the discount, they will make requests associated with the social networking account, and all of these requests will be directed to the same data center regardless of to which data center the friends are normally routed. Of course, in both examples, since the data centers offer the same services and utilize replicated data, the redirection occurs transparently to the users, with the possible exception of a slight increase in response time due to increased latency in accessing the other data center rather than the particular data center.

Block 370 comprises determining, for a second set of one or more of the requests, that no session (or other interaction) involving the particular account has been active with any other data center within the last period of time. Block 370 may be performed, for example, in the same manner as block 340. The second set of request(s) are different from the first set of request(s), and will be received at a more than trivial amount of time before or after the first set of request(s). For example, the second set of request(s) may be received after the first set of request(s) by an amount of time at least as great as a system-wide session or inactivity timeout. Otherwise, the particular data center would have determined that, on account of the redirected interactions of block 360, the other data center was still involved in interactions involving the particular account.

Block 380 comprises, responsive to the determination of block 370, servicing the second set of one or more of the requests at the particular data center, in similar manner to block 360.

Flow diagram 300 is but one example of a method for reducing conflicts. Other embodiments may feature fewer or additional elements in potentially varying orders. For example, block 320 may occur at regular or semi-regular intervals so that the data at each data center remains loosely synchronized. Thus block 320 may be performed at various times in relation with the other blocks of flow 300, including before, after, and even during each of the other blocks. Block 310 and 330 may similarly be performed at multiple times relative to the other blocks of flow 300.

The data centers may, of course, store other data in addition to the account data. In an embodiment, in contrast to the technique depicted in flow 300, the data centers may service requests to access this other data without determining whether to redirect the requests.

4.0. Implementation Examples

In blocks 340 and 370, the period of time for which each data center will check for sessions (or other interactions) associated with the particular account may vary from embodiment to embodiment. For example, in some embodiments, the period may be one hour or even one day, while in other embodiments the period may be on the order of a few minutes or seconds. As mentioned previously, the period of time should be sufficiently large to ensure that the checking data center has finished replicating all data operations resulting from interactions involving the particular account. In some embodiments, the period of time should also be at least equal to the amount of time a session may remain active (e.g. the session or inactivity timeout), to avoid redirecting a user in the middle of a session.

In an embodiment, the period of time may be a global, arbitrarily large period of time that was predefined by a system administrator for all data centers. In an embodiment, the period of time may simply be equal to the session or inactivity timeout of the system. In an embodiment, the predefined period of time may vary from data center to data center. For example, one data center may be able to replicate changes faster than another data center, and will thus look for account activity within a smaller time frame than another user. In some embodiments, the period of time checked is variable from instance to instance, depending on factors at the checking data center such as server load and/or time of day.

In an embodiment, the period of time is a function of when certain replication operations were sent to or processed by the other data centers. In an alternative embodiment, rather than simply check to see if sessions involving the particular account have occurred within a period of time, each data center checks to see whether any outstanding transactions involving data associated with the particular account have not yet been replicated at any of the other data centers. In environments where requests are only redirected upon log-in, the data center should nonetheless also check to see whether any sessions involving the particular account are still active.

In an embodiment, various optimizations may be utilized to avoid the particular data center having to send queries to some or all of the other data centers. For example, if the particular data center previously redirected a request associated with a particular account to another data center, the particular data center may continue to redirect the request for a period of time. As another example, if the particular data center serviced a request associated with a particular account within a last period of time, the particular data center may service new requests associated with the particular account during that time period without checking with other data centers. As another example, if the particular data center has recently received a query from third data center involving the particular account, the particular data center may request that the third data center instruct the particular data center where to redirect the request.

As another example, each data center may periodically proactively announce to each other data center the account identifiers that are associated with current sessions at the data center. Thus, each data center has relatively up-to-date account "state" data indicating which accounts are active at which data centers. If a particular account was specified in one of these announcements within a certain time period of the announcement, the particular data center will redirect requests associated with the particular account to the announcing data center. Similarly, the data centers may periodically share session log information in order to intelligently identify when other data centers have recently interacted with a particular account. However, owing to the latency between data centers, these techniques may not be able to establish that none of the data centers have recently interacted with the particular account. The particular data center thus may still need to query the other data centers if the particular data center does not find the particular account specified in its "state" data.

In an embodiment, when another data center is responding to a query from the particular data center, if the other data center has conducted a session involving the account within the relevant period of time, the other data center may include a timestamp of the last interaction involving the particular account. The particular data center may use this timestamp for a variety of purposes. For example, if an operation involving the particular account and the timestamp has been replicated to the particular data center, the particular data center may determine that the particular data center does not need to redirect the request. Or the particular data center may utilize the timestamp to determine how long to redirect requests involving the particular account to the other data center. In an embodiment, the other data center may further include data indicating whether any sessions involving the particular account are still active (i.e. have not logged out or timed-out), in which case the request should be redirected regardless of the timestamp of the last interaction.

Occasionally, while a particular data center is waiting for a response to a query regarding whether other data centers have recently interacted with a particular account, the particular data center may itself receive a query, from another data center, requesting whether the particular data center has recently interacted with a particular account. Any suitable locking technique may be used to avoid conflicts in such situations. For example, the particular data center may compare timestamps associated with the other query to determine which of the data centers issued the query first. Or, the data centers may have assigned priorities that indicate which data center should assume responsibility for interacting with the particular account. Various protocols may be used to formulate messages between the data centers to resolve any conflicts that may resolve in such situations.

For the purposes of simplification, this disclosure has used descriptions such as "interacting with a particular account," "a session involving the particular account has been active," or "engaged in a session involving a particular account" to interchangeably refer to the state of data center with respect to the particular account. The exact technical meaning of these terms will vary from embodiment to embodiment. For example, the time at which a data center last interacted with a particular account may, in some embodiments, be the time at which the data center last received a message in any session involving requests that presented appropriate account-identifying information for the account. In other embodiments, the time at which a data center last interacted with a particular account may be the time at which the data center last changed data associated with the account in response to a client request. In other embodiments, the time at which a data center last interacted with a particular account may be relative to either of the above mentioned times. Other technical meanings for these terms are also possible, depending on the technical details of the systems in which the techniques described herein are implemented.

5.0. Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
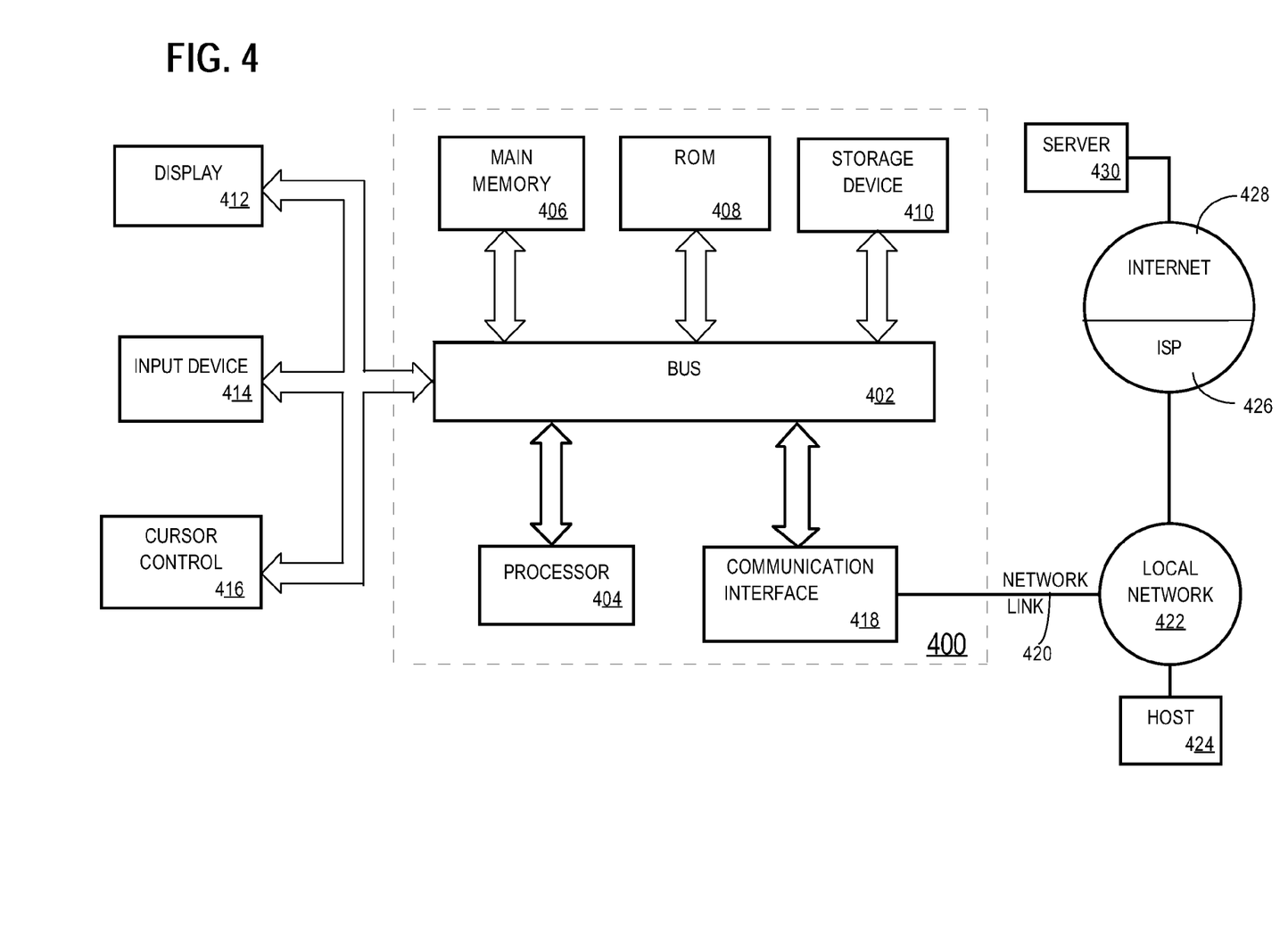
FIG. 4 is block diagram of a computer system upon which embodiments of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

6.0. Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
storing, in each of a plurality of geographically-separated data centers, data that includes at least first data items that are each associated with one or more particular accounts of a plurality of accounts;
asynchronously replicating changes to the data from each data center of the plurality of geographically-separated data centers to each other data center of the plurality of geographically-separated data centers;
receiving, from one or more clients, at a particular data center of the plurality of geographically-separated data centers, requests associated with a particular account of the plurality of accounts;
responsive to determining, for a first set of one or more of the requests, that client interactions involving the particular account occurred within a last period of time at a first data center of the plurality of geographically-separated data centers: redirecting the first set of one or more of the requests to the first data center and servicing the first set of one or more of the requests from the first data center;
responsive to determining, for a second set of one or more of the requests, that no client interactions involving the particular account occurred at any other data center of the plurality of geographically-separated data centers within the last period of time: servicing the second set of one or more of the requests at the particular data center;
wherein the method is performed by one or more computing devices.

2. The method of claim 1, wherein each data center of the plurality of geographically-separated data centers is coupled to each other data center of the plurality of geographically-separated data centers by high-latency connections.

3. The method of claim 1,
wherein servicing a given request of the requests comprises: signing-in to the particular account at a given data center, and changing particular data associated with the particular account at the given data center;
wherein the changes to the particular data are replicated from the given data center to other data centers.

4. The method of claim 1, wherein redirecting the first set of one or more of the requests comprises, responsive to a sign-in request in the first set, replying to the sign-in request with an Hyper-text Transport Protocol response message, the Hyper-text Transport Protocol response message including redirection instructions in a Hyper-text Transport Protocol response header.

5. The method of claim 1, wherein determining that no client interactions involving the particular account occurred at any other data center of the plurality of geographically-separated data centers within the last period of time comprises, for at least a first particular request requesting access to one or more particular data items associated with the particular account:
    determining that an existing session involving the particular account has been active at the particular data center within the last period of time.

6. The method of claim 1, wherein determining that no client interactions involving the particular account occurred at any other data center of the plurality of geographically-separated data centers within the last period of time comprises, for at least a first particular request requesting access to one or more particular data items associated with the particular account:
    querying an account log to identify which of the particular data centers, if any, has an active session involving the particular account.

7. The method of claim 1, further comprising:
    responsive to servicing the second set of one or more of the requests at the particular data center, replicating state data to each other data center of the plurality of geographically-separated data centers, indicating that the particular data center interacted with the particular account at a time when the second set of one or more of the requests was serviced.

8. The method of claim 1, wherein the first set of one or more of the requests were assigned by proximity to the particular data center, wherein the first data center to which the first set of one or more of the requests are redirected is not a data center to which the first set of one or more requests would have been assigned by proximity.

9. The method of claim 1, wherein the data stored at each data center of the plurality of geographically-separated data centers includes second data items that are different from the first data items, wherein the particular data center services requests to access the second data without determining whether any client interactions involving any accounts have occurred.

10. The method of claim 1, wherein the requests are requests to application servers, wherein the period of time is based on a session inactivity timeout defined for the application servers.

11. The method of claim 1, further comprising the particular data center not redirecting one or more anonymous requests from one or more clients that issued the first set of one or more of the requests until the one or more clients sign-in to the particular account.

12. One or more non-transitory media storing instructions that, when executed by one or more computing devices, cause:
    storing, in each of a plurality of geographically-separated data centers, data that includes at least first data items that are each associated with one or more particular accounts of a plurality of accounts;
    asynchronously replicating changes to the data from each data center of the plurality of geographically-separated data centers to each other data center of the plurality of geographically-separated data centers;
    receiving, from one or more clients, at a particular data center of the plurality of geographically-separated data centers, requests associated with a particular account of the plurality of accounts;
    responsive to determining, for a first set of one or more of the requests, that client interactions involving the particular account occurred within a last period of time at a first data center of the plurality of geographically-separated data centers: redirecting the first set of one or more of the requests to the first data center and servicing the first set of one or more of the requests from the first data center;
    responsive to determining, for a second set of one or more of the requests, that no client interactions involving the particular account occurred at any other data center of the plurality of geographically-separated data centers within the last period of time: servicing the second set of one or more of the requests at the particular data center.

13. The one or more non-transitory media of claim 12, wherein each data center of the plurality of geographically-separated data centers is coupled to each other data center of the plurality of geographically-separated data centers by high-latency connections.

14. The one or more non-transitory media of claim 12,
    wherein servicing a given request of the requests comprises: signing-in to the particular account at a given data center, and changing particular data associated with the particular account at the given data center;
    wherein the changes to the particular data are replicated from the given data center to other data centers.

15. The one or more non-transitory media of claim 12, wherein redirecting the first set of one or more of the requests comprises, responsive to a sign-in request in the first set, replying to the sign-in request with an Hyper-text Transport Protocol response message, the Hyper-text Transport Protocol response message including redirection instructions in a Hyper-text Transport Protocol response header.

16. The one or more non-transitory media of claim 12, wherein determining that no client interactions involving the particular account occurred at any other data center of the plurality of geographically-separated data centers within the last period of time comprises, for at least a first particular request requesting access to one or more particular data items associated with the particular account:
    determining that an existing session involving the particular account has been active at the particular data center within the last period of time.

17. The one or more non-transitory media of claim 12, wherein determining that no client interactions involving the particular account occurred at any other data center of the plurality of geographically-separated data centers within the last period of time comprises, for at least a first particular request requesting access to one or more particular data items associated with the particular account:
    querying an account log to identify which of the particular data centers, if any, has an active session involving the particular account.

18. The one or more non-transitory media of claim 12, wherein the instructions, when executed by the one or more computing devices, further cause:
    responsive to servicing the second set of one or more of the requests at the particular data center, replicating state data to each other data center of the plurality of geographically-separated data centers, indicating that the particular data center interacted with the particular account at a time when the second set of one or more of the requests was serviced.

19. The one or more non-transitory media of claim 12, wherein the first set of one or more of the requests were assigned by proximity to the particular data center, wherein the first data center to which the first set of one or more of the requests are redirected is not a data center to which the first set of one or more requests would have been assigned by proximity.

20. The one or more non-transitory media of claim 12, wherein the data stored at each data center of the plurality of geographically-separated data centers includes second data items that are different from the first data items, wherein the particular data center services requests to access the second data without determining whether any client interactions involving any accounts have occurred.

21. The one or more non-transitory media of claim 12, wherein the requests are requests to application servers, wherein the period of time is based on a session inactivity timeout defined for the application servers.

22. The one or more non-transitory media of claim 12, wherein the instructions, when executed by the one or more computing devices, further cause the particular data center not redirecting one or more anonymous requests from one or more clients that issued the first set of one or more of the requests until the one or more clients sign-in to the particular account.

23. A system comprising:
   a plurality of computing devices connected by one or more networks, the plurality of computing devices configured to perform:
      storing, in each of a plurality of geographically-separated data centers, data that includes at least first data items that are each associated with one or more particular accounts of a plurality of accounts;
      asynchronously replicating changes to the data from each data center of the plurality of geographically-separated data centers to each other data center of the plurality of geographically-separated data centers;
      receiving, from one or more clients, at a particular data center of the plurality of geographically-separated data centers, requests associated with a particular account of the plurality of accounts;
      responsive to determining, for a first set of one or more of the requests, that client interactions involving the particular account occurred within a last period of time at a first data center of the plurality of geographically-separated data centers: redirecting the first set of one or more of the requests to the first data center and servicing the first set of one or more of the requests from the first data center; and
      responsive to determining, for a second set of one or more of the requests, that no client interactions involving the particular account occurred at any other data center of the plurality of geographically-separated data centers within the last period of time: servicing the second set of one or more of the requests at the particular data center.

24. The system of claim 23,
wherein the requests are requests to application servers;
wherein the period of time is based on a session inactivity timeout defined for the application servers;
wherein redirecting the first set of one or more of the requests includes, responsive to a sign-in request in the first set, replying to the sign-in request with an Hyper-text Transport Protocol response message, the Hyper-text Transport Protocol response message including redirection instructions in a Hyper-text Transport Protocol response header.

\* \* \* \* \*